Patented Nov. 13, 1934

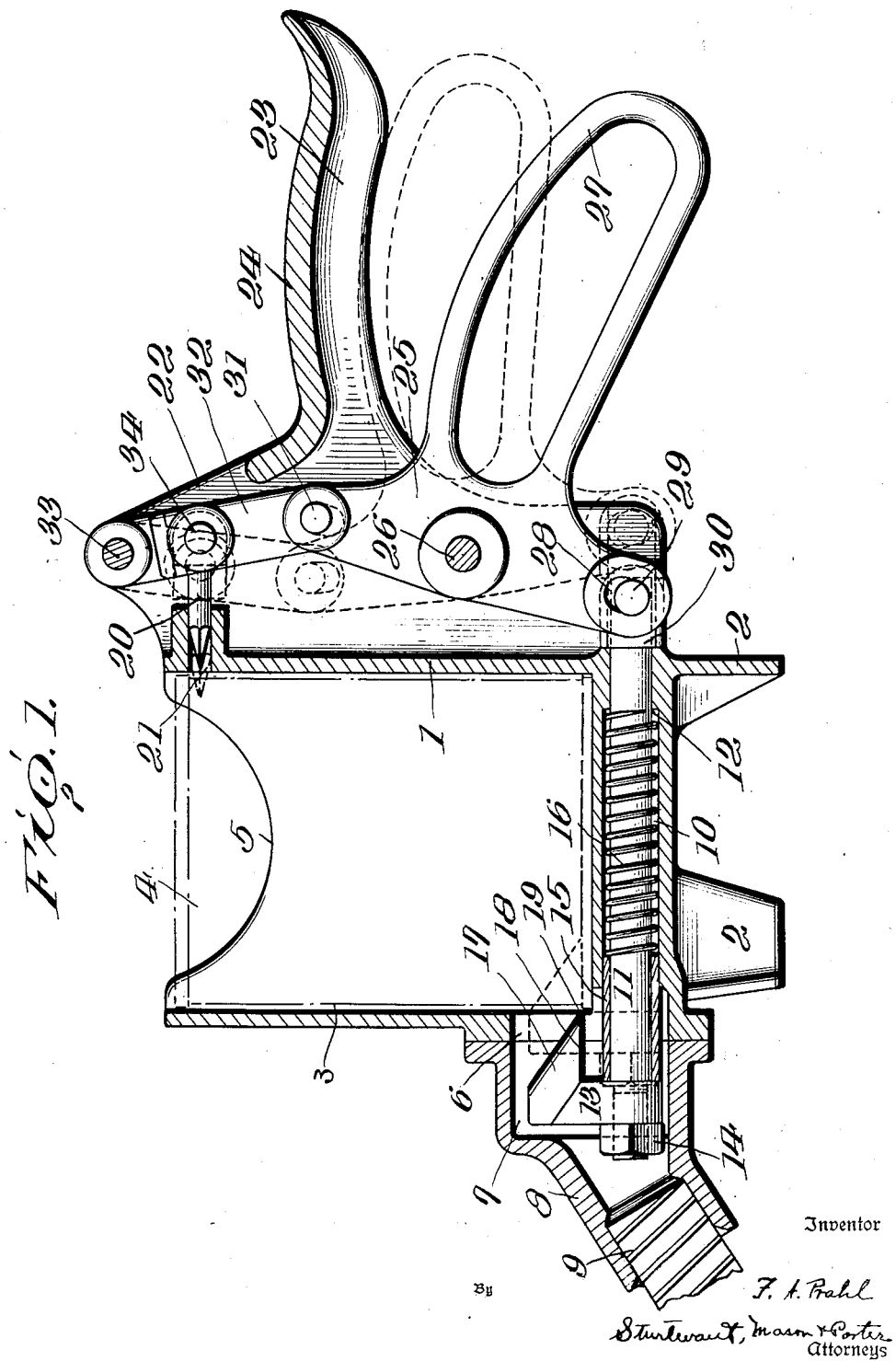

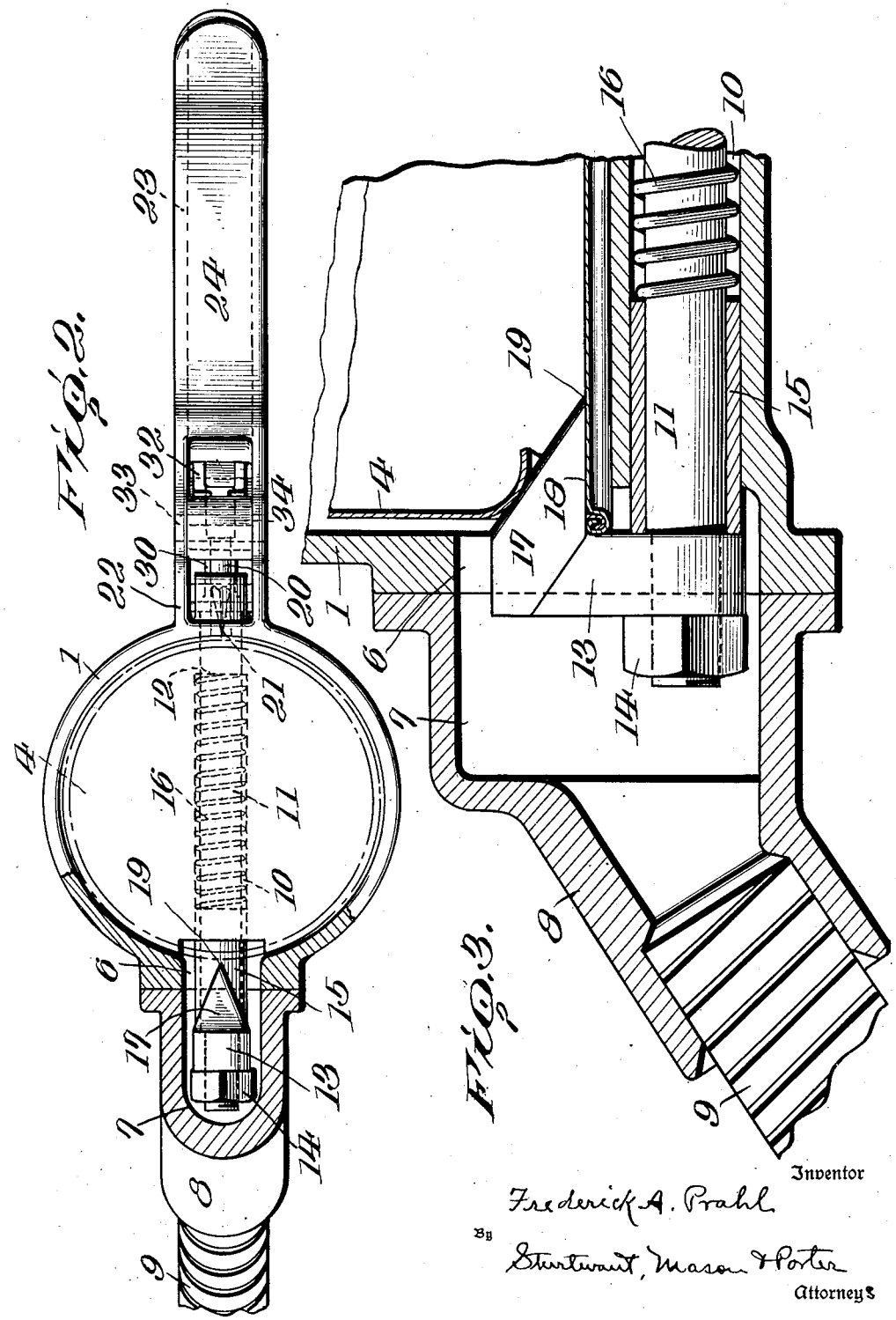

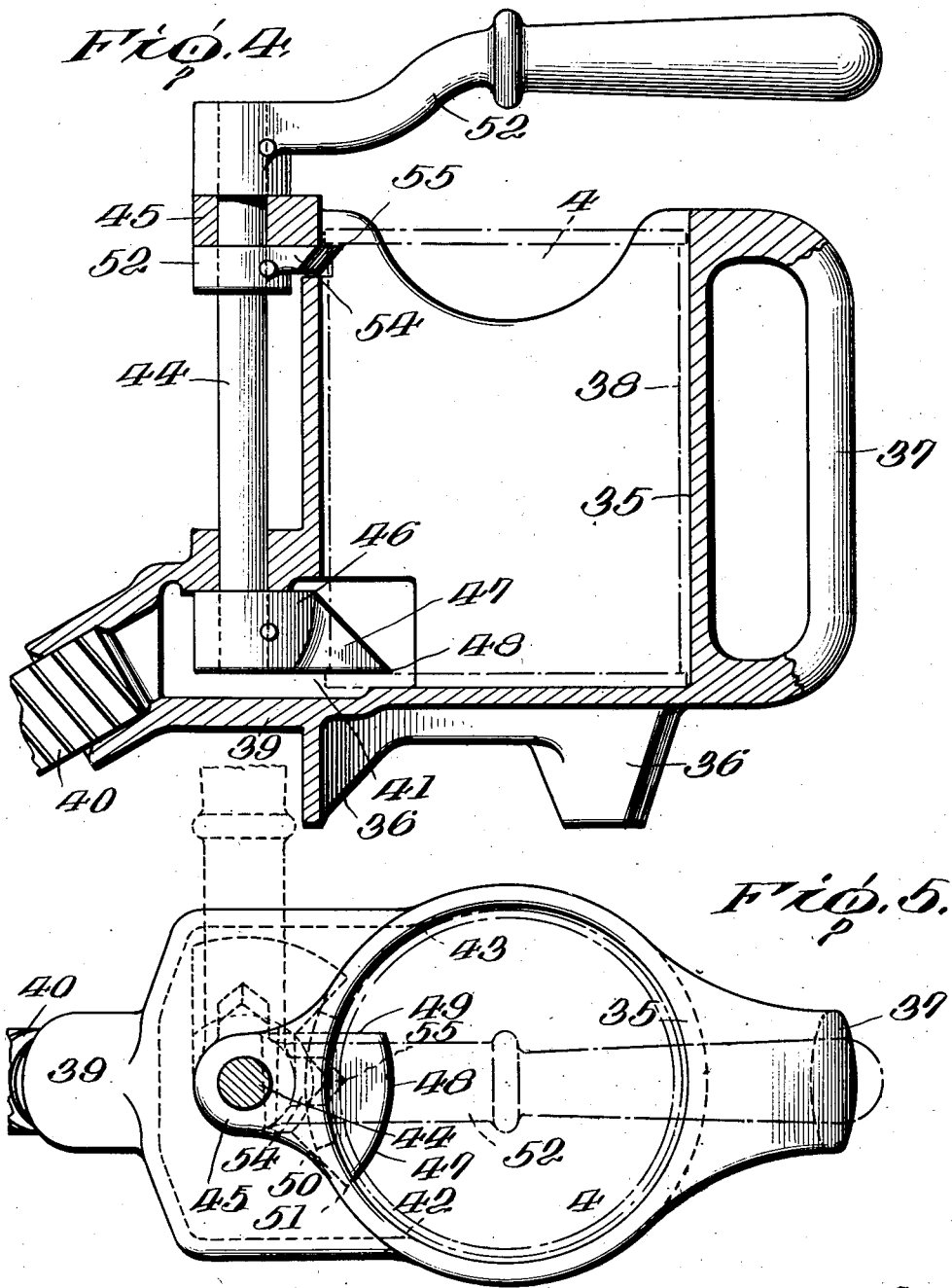

1,980,434

UNITED STATES PATENT OFFICE 1,980,434

DEVICE FOR DISPENSING LUBRICANT FROM SEALED CONTAINERS

Frederick A. Prahl, New York, N. Y., assignor to Continental Can Company, Inc., New York, N. Y., a corporation of New York Application March 21, 1932, Serial No. 600,325

8 Claims. (Cl. 221—23)

The invention relates to new and useful improvements in a device for dispensing liquids, and more particularly to a device used for dispensing a measured quantity of liquid from a sealed container.

An object of the invention is to provide a dispensing device having means to receive a sealed container, means for rupturing the wall of the container after it is placed in the dispensing device, and means for receiving the liquid from the container and for delivering the same to the place where it is to be used.

A further object of the invention is to provide a dispensing device of the above character wherein the means for rupturing the wall of the container may be used as a valve for controlling the flow of the liquid from the dispensing device.

A still further object of the invention is to provide a dispensing device of the above type wherein means is provided for puncturing the wall of the container for venting the same to permit the free discharge of the liquid from the container.

These and other objects will in part be obvious and will in part be hereinafter more fully disclosed.

In the drawings—

Figure 1 is a vertical sectional view through a container embodying the improvements;

Fig. 2 is an enlarged detail in horizontal section showing the container in place and punctured for the draining of the same;

Fig. 3 is a view partly in plan and partly in section of the same;

Fig. 4 is a view showing a modified form of dispensing device, and

Fig. 5 is a plan view of the device shown in Fig. 4.

In carrying out the invention, a dispensing device has been provided which includes a support for a sealed container having a measured amount of liquid therein. The support is shaped so as to form a chamber at the lower end of the container for receiving and dispensing the liquid to the place where it is to be used. The dispensing device is particularly adapted for dispensing a lubricating medium, and may be provided with a flexible spout for receiving the lubricant from the chamber in the support and directing the same to the chamber where it is to be used. Located in the support is a device for rupturing the side wall of the container just above the double seam at the lower end of the container. There is also a device for puncturing the wall of the container at the upper end thereof for venting the container to permit the free flow of the liquid therefrom. Means is also provided whereby the operator may readily actuate a cutting device for rupturing the side wall of the container, and a puncturing device for puncturing the side wall thereof. The cutting device may be so controlled by the operator as to regulate the flow of the liquid from the container into the chamber after the container wall has been ruptured. This enables the flow of lubricant through the dispensing spout to be controlled so that the lubricant may be readily discharged on to a strainer and the flow controlled to correspond to the capacity of the strainer to take care of the lubricant.

The invention will possibly be better understood by a detailed reference to the present illustrated embodiment thereof. In Figures 1 to 3 of the drawings, a dispensing device is shown which consists of a support 1 having depending spaced legs 2, 2 on which the dispensing device may rest when out of use. The device is also provided with a cylindrical wall forming a chamber 3 adapted to receive a sealed container 4. The sealed container 4 is of the usual type of metal container. It includes a cylindrical body portion with the ends double seamed thereto. Such a container is hermetically sealed and cannot be opened to give access to the contents thereof without destroying the container, and therefore, it cannot be refilled and reclosed. The container is shown as placed in the chamber 3. The upper wall of the chamber is cut away as indicated at 5 so as to provide a space permitting the operator to grip the top of the container by the hand and place the container in the chamber 3. The supporting device is provided with an opening 6 at the bottom thereof, which leads to a chamber 7 in a nozzle or extension 8 which is fixed to the outer wall of the supporting device. This nozzle or extension inclines downwardly and connected thereto is a flexible spout 9 of the usual type which may be bent upwardly or downwardly and positioned as desired for dispensing the lubricating medium flowing into the chamber 7.

The bottom portion of the dispensing device is provided with a recess 10 in which is mounted a rod 11. The right-hand end of the recess as viewed in Fig. 1 is closed, but the rod extends on out through the wall of the support. The recess is larger than the rod and provides a shoulder 12 at the inner end thereof. Mounted on the rod is a cutter head 13 which is secured on the rod by a nut 14. There is a sleeve 15 surrounding the rod and bearing against the cutter head. A spring 16 located in the recess bears against this sleeve 15 and against the shoulder 12 and normally forces the rod to the left as viewed in Fig. 1. Mounted on the cutter head is a cutter 17. The lower face of the cutter is horizontal as indicated at 18. The side faces of the cutter incline away from the center and rearwardly from the center so as to provide a sharp cutting point 19. When the cutter is retracted as shown in Fig. 1, this cutter point is housed within the chamber 7 and the container may be placed in the chamber 3. The cutter head is so positioned that when the container rests on the bottom support of the chamber, the lower face of the cutter is just above the double seam which joins the bottom end of the container to the side wall thereof. When the cutter is moved to the right as viewed in Fig. 1, to the position shown in Fig. 2, the cutter will puncture the side wall of the container, and the cutting of the wall of the container is substantially on the level of the inner face of the bottom end of the container, and, therefore, the container will drain completely through the aperture provided by the cutter. The metal of the container will be sheared along a line just above the double seam and will be rolled inwardly and upwardly by the inclined face of the cutter, as clearly shown in Fig. 3. When the cutter is in the position shown in Fig. 2, it will close the opening formed by the cutter and prevent any material draining of the lubricant from the container until the cutter is withdrawn. If it is fully withdrawn, then the aperture is wide open, allowing the free passage of the lubricant therethrough. The cutter may be shifted manually so as to partly close the aperture, and thus serve as a valve for regulating the flow of lubricant from the dispensing device.

Adjacent the upper end of the dispensing device is a puncturing tool 20 having a sharp cutting point 21. This puncturing tool is moved inward and punctures the metal of the container just below the upper double seam and this provides a vent opening so that the lubricant in the container will flow freely through the aperture made at the bottom of the container.

The support for the container is provided with laterally projecting bracket members 22, 22 which are spaced from each other. These bracket members are each provided with a handle 23 and a connecting web 24 joins the handles. Located between the bracket members 22, 22 is a lever 25. Said lever is pivoted at 26 to the bracket members 22, 22. The lever has a handle portion 27 which is in loop form. The lower end of the lever 25 is slotted at 28 and engages a pin 29 carried by a head 30 attached to the rod 11.

The lever 25 is also pivoted at 31 to a second lever 32. This lever 32 is in turn pivoted at 33 to the bracket members 22, 22. The puncturing device 20 is pivoted at 34 to this lever 32. There is a slot and pin connection between the two levers.

The lubricating medium to be dispensed is sealed in containers, each container having a measured amount. The customer desiring the lubricating medium may inspect the container in its sealed condition, after which it can be placed in the dispensing device, and by pulling up on the handle of the lever 25, the container is ruptured by the cutter 17 and it is also punctured by the puncturing device 20. The flexible spout is then positioned properly for dispensing the lubricating medium and the cutter released so that it is withdrawn from the aperture, thus permitting the lubricant to flow freely into the chamber 7, and from the chamber 7 through the spout into the chamber where it is to be used as a lubricant. By partially withdrawing the cutter, or by reinserting the cutter to a certain extent in the aperture in the container, the flow of the lubricant can be controlled as it is dispensed. After the lubricant is fully dispensed, the container is thrown away, as it has been destroyed in order to remove the lubricant therefrom.

In Figures 4 and 5 of the drawings, a slightly modified form of support for the container and means for operating the cutter is shown. In this form of the invention, the dispensing device includes a support 35 provided with suitable legs 36, 36 and with a handle 37. The support is constructed so as to provide a chamber 38 in which the container 4 may be placed. Extending from the body of the support and preferably formed integral therewith is a nozzle or extension bracket 39 to which a flexible spout 40 is attached. In this bracket is a chamber 41. The bracket is extended laterally as shown in Fig. 5, and the wall of the support adjacent the bracket has an opening extending from the point 42 to the point 43. Extending through the upper wall of this bracket is a shaft 44. The shaft 44 is also mounted in a laterally extending bearing bracket 45 and projects above the same. Secured to the shaft at the lower end thereof is a cutter head 46 carrying a cutter 47. The cutter 47 is provided with a curved face 48 and a straight face 49 leading to a sharp angle to the curved face 48. There is also a face 50 which is substantially radial of the shaft 44 and which intersects the curved face 48 at a sharp angle, thus forming a cutting point 51. At the upper end of the shaft 44 is a handle 52 which may be used for manually oscillating the shaft 44. The handle is turned from its position over the chamber for the container, and this permits the inserting of the container. At this time the cutter is completely withdrawn from the chamber. After the container has been placed in the chamber, the turning of the shaft through the aid of the handle 52 will cause the cutter to rupture the wall of the container just above the double seam, thus providing an aperture through which the contents of the container may be discharged into the chamber 41 and out through the dispensing spout 40. Attached to the shaft 44 just below the bearing bracket 45 is a second cutter head 53 carrying a cutter 54. The cutter 54 is provided with a cutting edge terminating in a cutting point 55. When the shaft 44 is oscillated for rupturing the metal at the lower end of the container, this cutting point 55 will puncture the wall of the container adjacent the double seam, and thus vent the container so that the lubricating medium will flow freely therefrom. The device shown in Figures 4 and 5 is used in precisely the same manner as the device shown in Figures 1 to 3, and the cutter which ruptures the metal at the lower end of the container may be used as a valve for regulating the flow of the lubricating medium from the container.

While I have described in detail a flexible spout for dispensing the lubricant, it will be understood that a rigid spout may be used for dispensing the lubricant from the chamber which receives the same from the container, said spout and chamber for the container functioning as a funnel. It will also be understood that the dispensing device may be provided with a short nozzle for discharging the lubricant directly into a funnel. While I have described the cutter as rupturing the wall of the can body adjacent the double seam, it will be understood that the container may be ruptured at other places, it being essential only that it shall be ruptured at a position which will cause the draining of the contents of the container therefrom. The same is true as to the puncturing of the side wall for venting. The vent may be otherwise located. While I have described a means for simultaneously operating the cutter for rupturing the container and venting the container, it will be understood that from certain aspects of the invention, this device may be independently operated and under certain conditions the rupturing of the container for draining the contents may be used without venting. While the device has been described in detail as used for the dispensing of a lubricant, it will be understood that it may be used for dispensing material of any character, which, through its own weight, will be automatically dispensed through the opening formed at the bottom of the container by the rupturing of the metal.

It is obvious that changes may be made in the details of construction and the arrangement of the parts without departing from the spirit of the invention as set forth in the appended claims.

Having thus described the invention, what I claim as new and desire to secure by Letters Patent, is—

1. A dispensing device for containers comprising a body having a bottom member and side walls forming a chamber shaped to conform to the end of the container, said body having an extension at one side thereof provided with a passage leading to said chamber, a spout attached to said extension and communicating with said passage, a cutter normally housed within said passage in said extension and movable into said chamber in a direction parallel with the end member for forming an opening in the side wall of the container, said cutter having a piercing point at the lower side thereof spaced from the bottom member of the chamber sufficiently to penetrate the wall of the container directly above the double seam, said cutter having cutting edges inclining upwardly from the piercing point for severing the can wall and for rolling the severed portion inwardly and upwardly so as to provide a free opening for dispensing the oil from the container in said chamber through said passage into said spout and means attached to said cutter whereby said cutter may be manually operated for opening the sealed container.

2. A dispensing device for containers comprising a body having a bottom member and side walls forming a chamber shaped to conform to the end of the container, said body having an extension at one side thereof provided with a passage leading to said chamber, a spout attached to said extension and communicating with said passage, a cutter normally housed within said passage in said extension and movable into said chamber in a direction parallel with the end member for forming an opening in the side wall of the container, said cutter having a piercing point at the lower side thereof spaced from the bottom member of the chamber sufficiently to penetrate the wall of the container directly above the double seam, said cutter having cutting edges inclining upwardly from the piercing point for severing the can wall and for rolling the severed portion inwardly and upwardly so as to provide a free opening for dispensing the oil from the container in said chamber through said passage into said spout, said cutter being rigid with a supporting member therefor, said supporting member being extended to a point outside of said body portion of the container where said supporting member may be manually operated upon for actuating the cutter and means attached to said cutter whereby said cutter may be manually operated for opening the sealed container.

3. A dispensing device for containers comprising a supporting chambered member adapted to receive and house a greater portion of a sealed container, a dispensing nozzle connected to the lower portion of said chamber, a rod extending through said supporting member beneath the chamber therein, a cutter carried by said rod and adapted to rupture the container while in said chamber and at the lower end thereof, a spring for moving said rod to retract the cutter and a lever pivotally connected to said member and to said rod for moving the rod to cause the cutter to rupture the container.

4. A dispensing device for containers comprising a supporting chambered member adapted to receive and house a greater portion of a sealed container, a dispensing nozzle connected to the lower portion of said chamber, a rod extending through said supporting member beneath the chamber therein, a cutter carried by said rod and adapted to rupture the container while in said chamber and at the lower end thereof, a spring for moving said rod to retract the cutter and a lever pivotally connected to said member and to said rod for moving the rod to cause the cutter to rupture the container, said cutter being shaped so as to serve as a valve for controlling the flow of liquid medium through the dispensing opening formed by the cutter in the container.

5. A dispensing device for lubricants comprising a supporting chambered member adapted to receive a sealed container having a lubricant therein, a cutter carried by said container supporting member for rupturing the metal of the container immediately above the lower double seam thereof, a handle for said dispensing device, a lever mounted on the dispensing device adjacent the handle and connected to said cutter for manually shifting the same to rupture the metal of the container, a puncturing device carried by said support and disposed adjacent the upper end of the container, and a second lever connected to and operated by said first-named lever for moving said puncturing device to puncture the wall of the container when the cutter operates to rupture the wall of the container at the lower end thereof.

6. A dispensing device for lubricants comprising a supporting chambered member adapted to receive a sealed container having a lubricant therein, a cutter carried by said container supporting member for rupturing the metal of the container immediately above the lower double seam thereof, a handle for said dispensing device, a lever mounted on the dispensing device adjacent the handle and connected to said cutter for manually shifting the same to rupture the metal of the container, a puncturing device carried by said support and disposed adjacent the upper end of the container, a second lever connected to and operated by said first-named lever for moving said puncturing device to puncture the wall of the container when the cutter operates to rupture the wall of the container at the lower end thereof, and a spring for withdrawing said cutter and said puncturing device from the container and the chamber therefor when the lever is released.

7. A dispensing device for lubricants comprising a supporting member having a chamber to receive a container, a bracket member adjacent the lower end of the dispensing device and having a chamber connected with the chamber receiving the container, a vertical shaft extending into said chamber in the bracket member, a cutter carried thereby, a flexible spout connected to said bracket member, and means whereby said shaft may be oscillated for rupturing the metal in the container adjacent the lower double seam whereby the lubricant therein is drained into the chamber of the bracket member and thence into the flexible spout.

8. A dispensing device for lubricants comprising a supporting member having a chamber to receive a container, a bracket member adjacent the lower end of the dispensing device and having a chamber connected with the chamber receiving the container, a vertical shaft extending into said chamber in the bracket member, a cutter carried thereby, a flexible spout connected to said bracket member, and means whereby said shaft may be oscillated for rupturing the metal in the container adjacent the lower double seam whereby the lubricant therein is drained into the chamber of the bracket member and thence into the flexible spout, said shaft having a cutter adjacent the upper end of the container for puncturing the container when the metal in the wall of the container adjacent the lower double seam is ruptured.

FREDERICK A. PRAHL.